(12) United States Patent
Maddigan et al.

(10) Patent No.: US 8,898,502 B2
(45) Date of Patent: Nov. 25, 2014

(54) CLOCK DOMAIN CROSSING INTERFACE

(75) Inventors: Steven William Maddigan, Missauga (CA); Dimitri Gabriel Epassa Habib, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 723 days.

(21) Appl. No.: 13/176,160

(22) Filed: Jul. 5, 2011

(65) Prior Publication Data

US 2013/0013950 A1 Jan. 10, 2013

(51) Int. Cl.
| G06F 1/12 | (2006.01) |
| H04L 7/02 | (2006.01) |
| G06F 5/10 | (2006.01) |

(52) U.S. Cl.
CPC .. G06F 1/12 (2013.01); H04L 7/02 (2013.01); G06F 5/10 (2013.01); *G06F 2205/102* (2013.01)
USPC .......................................... 713/400; 327/211

(58) Field of Classification Search
USPC .......................................... 713/400; 327/211
See application file for complete search history.

(56) References Cited

U.S. PATENT DOCUMENTS

| 7,500,132 | B1 * | 3/2009 | Pothireddy et al. | 713/600 |
| 8,467,218 | B1 * | 6/2013 | Atsatt et al. | 365/63 |
| 2002/0121922 | A1 * | 9/2002 | Greenstreet et al. | 327/211 |
| 2003/0007394 | A1 * | 1/2003 | Phi et al. | 365/200 |
| 2003/0081713 | A1 * | 5/2003 | Pontius et al. | 375/372 |
| 2007/0288874 | A1 * | 12/2007 | Czeck et al. | 716/6 |
| 2008/0172540 | A1 * | 7/2008 | Lemke et al. | 711/167 |
| 2009/0323876 | A1 * | 12/2009 | Ono et al. | 375/354 |
| 2011/0204932 | A1 * | 8/2011 | Cortadella et al. | 327/145 |

OTHER PUBLICATIONS

"Clock Domain Crossing: Closing the Loop on Clock Domain Functional Implementation Problems", Cadence Design Systems, Inc., 2004.
Narain, P. and Cummings, C.: "Clock Domain Crossing Demystified: The Second Generation Solution for CDC Verification", Snug, Boston, 2008.

* cited by examiner

*Primary Examiner* — Chun Cao

(57) ABSTRACT

A flexible and scalable bi-directional CDC interface is set forth between clock domains in a SoC device. The interface comprises a pulse sync circuit for receiving a pulse synchronized to the source clock domain and in response outputting a busy signal to the source clock domain and outputting the pulse synchronized to said destination clock domain; an input register for latching data from said source clock domain in response to a transition of said source clock in the event said busy signal is not active and preventing said data from being latched in the event said busy signal is active so as not to corrupt previously latched data; and an output register for receiving said pulse from said pulse sync circuit and in response latching said pulse from said input register on a transition of said destination clock.

13 Claims, 7 Drawing Sheets

CLOCK DOMAIN CROSSING INTERFACE

BACKGROUND OF THE INVENTION

1. Field of the Invention

The present invention is directed to bus architectures for System-on-a-Chip (SoC) devices, and more particularly to a clock domain crossing interface for transferring a synchronous clock signal from one clock domain to another clock domain in a SoC device.

2. Description of the Related Art

The term "system-on-a-chip" or SoC commonly refers to an integrated circuit on which all of the necessary electronic circuits and parts are packaged to create a complete "system" (e.g. a hand-held or vehicle-mounted computer, cell phone, digital camera, etc.). Such circuits normally include a microcontroller or microprocessor, memory, timing sources, peripherals and external interfaces to analog and/or digital devices. These components are interconnected by a plurality of busses, such as those defined in the Advanced Microcontroller Bus Architecture (AMBA), developed by ARM Ltd. AMBA defines specifications for the busses used in SoC designs, and includes an Advanced System Bus (ASB), a High-performance Bus (AHB), Advanced Peripheral Bus (APB) and, more recently, an Advanced eXtensible Interface (AXI).

SoC development involves comprehensive and integrated design, verification, and application development phases before a design is committed to silicon. Design methodologies have traditionally focused on partition-based implementation and verification where the partitions are based on clock domains. A clock domain is defined as that part of the design driven by either a single clock or clocks that have constant phase relationships. Domains that have clocks with different phase and time relationships are considered to be different clock domains. Typical SoC devices include multiple interfaces operating at different clock frequencies, resulting in multiple asynchronous clock domains across which signals must pass.

A clock domain crossing (CDC) occurs when a signal crosses from one clock domain into another. Interfaces have been developed to facilitate such domain crossings. These interfaces must conform to strict design principles for reliable operation, which poses challenges in terms of verification. Since there is no constant phase and time relationship between different clock domains, a condition known as 'metastability' can occur if a signal is not asserted long enough to be registered such that the signal appears asynchronous on the incoming clock boundary.

It is known in the art to synchronize a signal that crosses from a lower clocked domain to a higher clocked domain by registering the signal through a flip-flop that is clocked by the lower frequency source clock domain, thereby holding the signal long enough to be detected by the higher frequency destination clock domain. However, synchronizing a signal that traverses from a higher frequency clock domain to a lower frequency clock domain typically requires a register in each clock domain with a feedback path from the destination domain to the source domain for confirming signal detection. For a discussion of these prior art approaches and the challenges of metastability in CDC design and verification, see *Clock Domain Crossing: Closing the Loop on Clock Domain Functional Implementation Problems*, Cadence Design Systems, Inc., 2004; and Narain, P. and Cummings, C, *Clock Domain Crossing Demystified: The Second Generation Solution for CDC Verification*, SNUG Boston 2008.

SUMMARY OF THE INVENTION

It is an aspect of the present invention to provide a flexible, lossless and scalable bi-directional CDC interface between clock domains in a SoC device. According to an exemplary embodiment, the CDC interface functions as a bridge between a first frequency clock domain, such as the APB interface synchronous to the APB clock (pclk) and a second frequency clock domain, such as the APB interface of an APB peripheral synchronous to its module clock (mclk). In some embodiments the first frequency clock domain may be higher than the second frequency clock domain, whereas in others the first and second frequency clock domains may be the same frequency but have an uncontrolled phase relationship (i.e. asynchronous relationship). A person of skill in the art will understand that the principles of the invention may be applied to CDC interfaces between other clock domains in a SoC device, and that the invention is not limited to CDC interfaces to the APB.

According to one aspect of the invention, there is provided a clock domain crossing interface for transferring data from a source clock domain to a destination clock domain, comprising at least one pulse sync circuit for receiving a write control signal synchronized to the source clock domain and in response outputting a busy signal to the source clock domain and outputting the write control signal synchronized to the destination clock domain; at least one input register for latching write data from the source clock domain in response to a transition of the source clock in the event the busy signal is not active and preventing the write data from being latched in the event the busy signal is active so as not to corrupt previously written latched data; and at least one output register for receiving the write control signal from the pulse sync circuit and in response latching the write data from the at least one input register on a transition of the destination clock.

According to a further aspect there is provided a pulse sync circuit for transferring a synchronous input pulse from a source clock domain to a destination clock domain, comprising a flip-flop for latching the input pulse in response to a transition of the source clock; a first clock sync module for transferring the latched input pulse from the flip-flop to the destination domain in response to a transition of the destination clock; a further clock sync circuit for transferring the latched pulse from the first clock sync module to the source domain in response to a transition of the source clock and applying the latched pulse to the flip-flop for resetting the flip-flop; and a gate for receiving the latched pulse from said flip-flop and the latched pulse from the further clock sync circuit and in response generating a busy signal.

According to an additional aspect there is provided a method of transferring data from a source clock domain to a destination clock domain, comprising receiving a write control signal synchronized to the source clock domain and in response outputting a busy signal to the source clock domain and outputting the write control signal synchronized to the destination clock domain; latching write data from the source clock domain in response to a transition of the source clock in the event the busy signal is not active and preventing the write data from being latched in the event the busy signal is active so as not to corrupt previously write latched data; and receiving the write control signal from the pulse sync circuit and in response latching the write data on a transition of the destination clock.

According to yet another aspect there is provided a method of transferring a synchronous input pulse from a source clock domain to a destination clock domain, comprising latching the input pulse in a flip-flop responsive to a transition of the source clock; transferring the latched input pulse from the flip-flop to the destination domain in response to a transition of the destination clock; receiving the latched pulse and outputting the pulse synchronized to a single cycle of the destination clock; transferring the latched pulse to the source domain in response to a transition of the source clock and applying the latched pulse to the flip-flop for resetting said flip-flop; and receiving the latched pulse from the flip-flop and the latched pulse transferred to the source domain and in response generating a busy signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
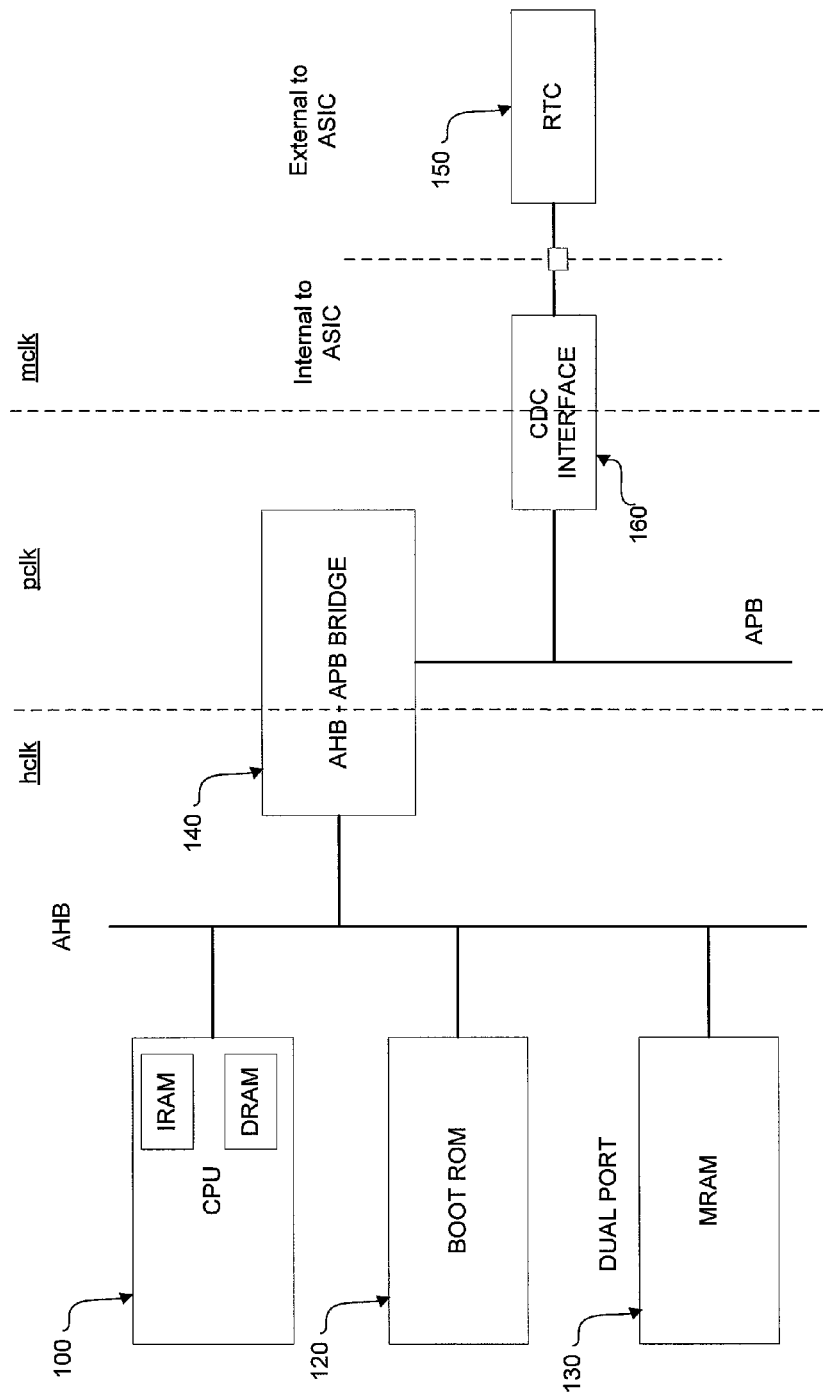
FIG. 1 is a simplified block diagram of a SoC device incorporating the CDC interface of the present invention.

FIG. 1 is a simplified block diagram of a typical AMBA-based SoC device incorporating the CDC interface of the present invention. A high-performance system backbone bus, AHB, is provided over which a plurality of modules communicate, such as a CPU 100 (e.g. a high performance ARM processor), on-chip messaging memory (MRAM) 120 and a boot ROM 130. The CPU 100 may incorporate tightly-coupled IRAM and DRAM memories. The MRAM 120 is preferably a dual-port memory (i.e. shared across multiple interfaces) that is accessible by an external host processor (not shown). A bus clock signal, hclk provides signal timing for all bus transfers to and from the AHB. According to the AMBA specification, all signal timing on the AHB is related to the rising edge of the hclk clock signal.

Also located on the high performance AHB is a bridge 140 to a lower bandwidth APB. The APB is designed for controlled access to register interfaces on system peripherals. According to the AMBA specification, all signal timing on the APB is related to the rising edge of a bus clock signal (pclk). The bridge 140 functions as an interface between the AHB and the APB, including address, control and data buffering.

In FIG. 1, a single peripheral is shown, external real time clock (RTC) 150, which operates in accordance with its own module clock (mclk). For ease of illustration, only one peripheral is shown. However, a conventional SoC device will typically include a plurality of peripherals, such as UARTs, timers, keyboard, etc.

The dashed lines in FIG. 1 represent the boundaries between different clock domains (i.e. hclk at 48 MHz, pclk at 24 MHz and mclk at 32 KHz) that govern signal timing within the SoC.

According to the present invention, a CDC interface 160 is provided that functions as a bridge between the APB interface synchronous to the APB clock (pclk) and the APB interface of the RTC 150 synchronous to its module clock (mclk). According to a preferred embodiment, CDC interface 160 provides back-to-back write protection, read-back data source register selection and register-by-register reset confirmation, as discussed in greater detail below.

Figure 2:
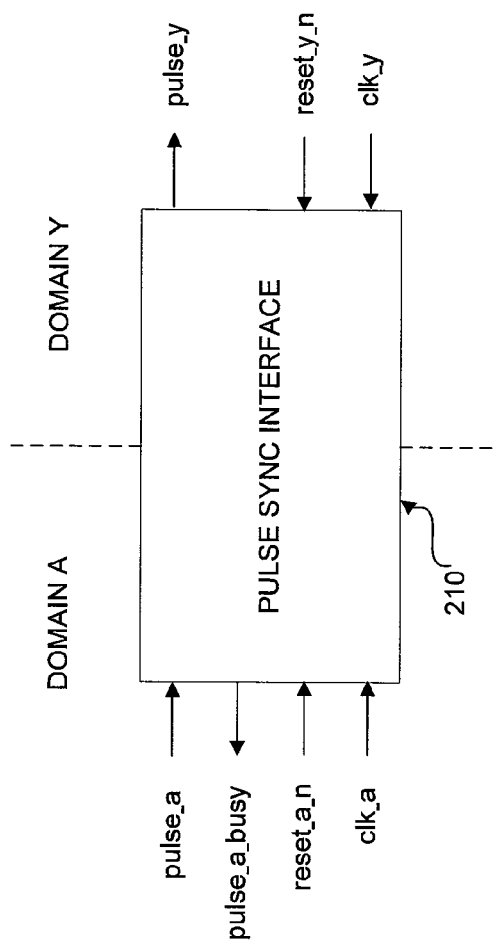
FIG. 2 shows signals input to and output from a pulse sync interface forming part of the CDC interface of the present invention.
Figure 3:
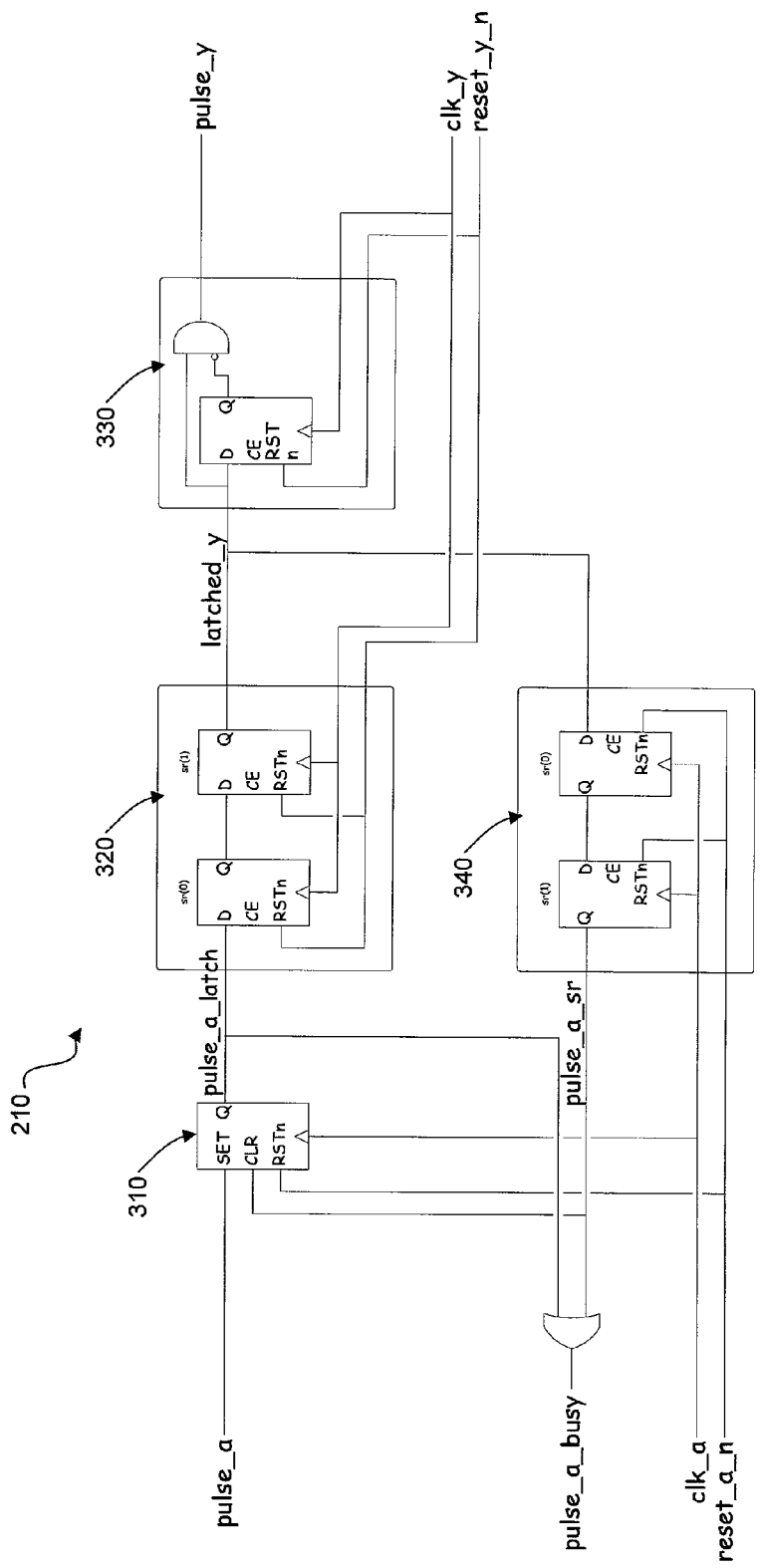
FIG. 3 is a block diagram of a pulse sync interface according to the present invention.
Figure 4:
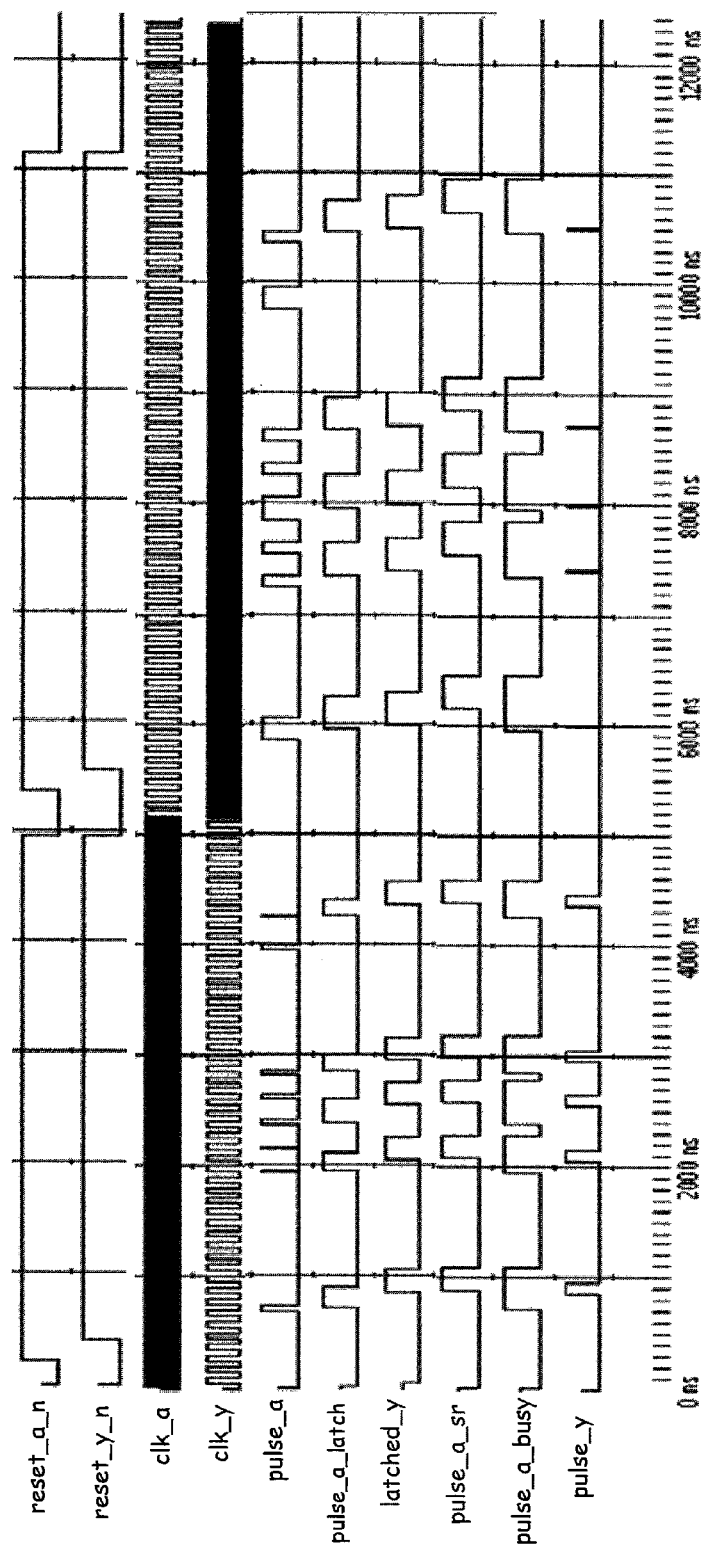
FIG. 4 is a timing diagram from the pulse sync interface of FIG. 3.

Prior to discussing details of the CDC interface 160 in the AMBA-based SoC architecture of FIG. 1, reference is made to FIGS. 2-4 depicting the design and operation of a pulse sync interface 210 within CDC 160, for performing cross domain signal transfer according to the present invention. The pulse sync interface 210 is operable to transfer a signal (pulse_a) from a source domain (domain A) to a destination domain (domain Y), for output as pulse_y. In the preferred embodiment, domain A is the APB domain synchronized by pclk and domain Y is the peripheral module domain mclk. Also, the APB according to the preferred embodiment is 32-bits wide and the register depth of CDC 160 is designed to be flexible, scalable and independent of data width, such that the design need be verified only once and thereafter can be used many times, thereby alleviating the prior art requirement to verify every instantiation. According to an exemplary embodiment the register depth of CDC 160 ranges from one up to 32. Accordingly, the design of pulse sync interface 210 is replicated for each data register accommodated by the APB.

The signals input to and output from pulse sync interface 210 include clk_a and clk_y which represent the clock signals for domain A domain Y, respectively, pulse_a which represents a synchronous input pulse to be transferred from domain A to domain Y, pulse_y which represents the pulse transferred from domain A to domain Y, reset_a_n and reset_y_n which represent asynchronous reset signals, and pulse_a_busy which represents a feedback signal for ensuring successful domain transfer of the pulse prior to the CDC being reset.

FIG. 3 shows the logic within pulse sync interface 210, and FIG. 4 is an exemplary timing diagram of the signals input to, output from and generated within the interface 210. In operation, the synchronous input pulse (pulse_a) from the source domain (domain A) is latched in a set/reset flip-flop 310. The pulse_a_latch signal from flip-flop 310 then crosses to the destination domain (domain Y) via a clock_sync module 320. The output signal (latched_y) from clock_sync module 320 passes through an edge detect circuit 330 for ensuring that the output signal (pulse_y) is asserted for a single domain Y clock pulse. As a result, write data is only written once to the destination clock domain registers, yielding a simple design and better power conservation, and the pulse_y output signal can be used directly as a counter increment enable signal to guarantee a single count per event from domain A.

The latched_y signal is also fed back to domain A through a second clock_sync module 340. The output signal (pulse_a_sr) from clock_sync module 340 performs two functions. First, it clears the set/reset flip-flop 310 for ensuring pulse detection (provided domain A is more than two times faster than domain Y). Second, it is logically OR'ed with the pulse_a_latch signal to provide a busy indicator (pulse_a_busy) for write protecting the write data register while the pulse completes the CDC transition, as discussed in greater detail below with reference to FIG. 5A. Subsequent register access is delayed until the set/reset flip-flop 310 is cleared and the CLR signal is released (pulse_a_sr changes to logical 0) so that set/reset flip-flop 310 is ready to capture another pulse. Thus, the pulse_a_latch signal functions as a busy indicator.

Figure 5A:
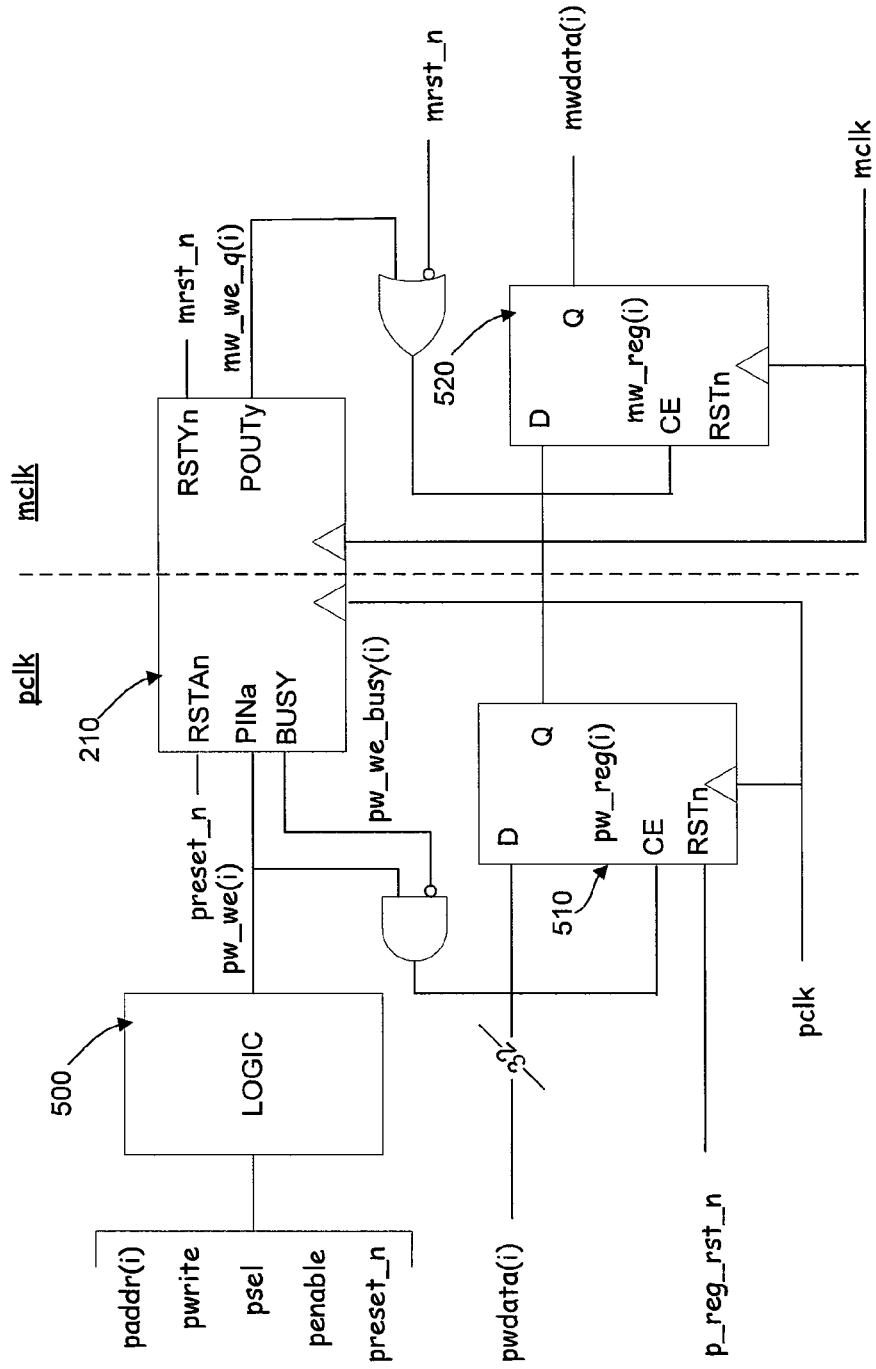
FIG. 5A is a block diagram of a portion of the CDC interface for writing data from the pclk domain of the APB in FIG. 1 to the mclk domain of the peripheral, according to a preferred embodiment.
Figure 5B:
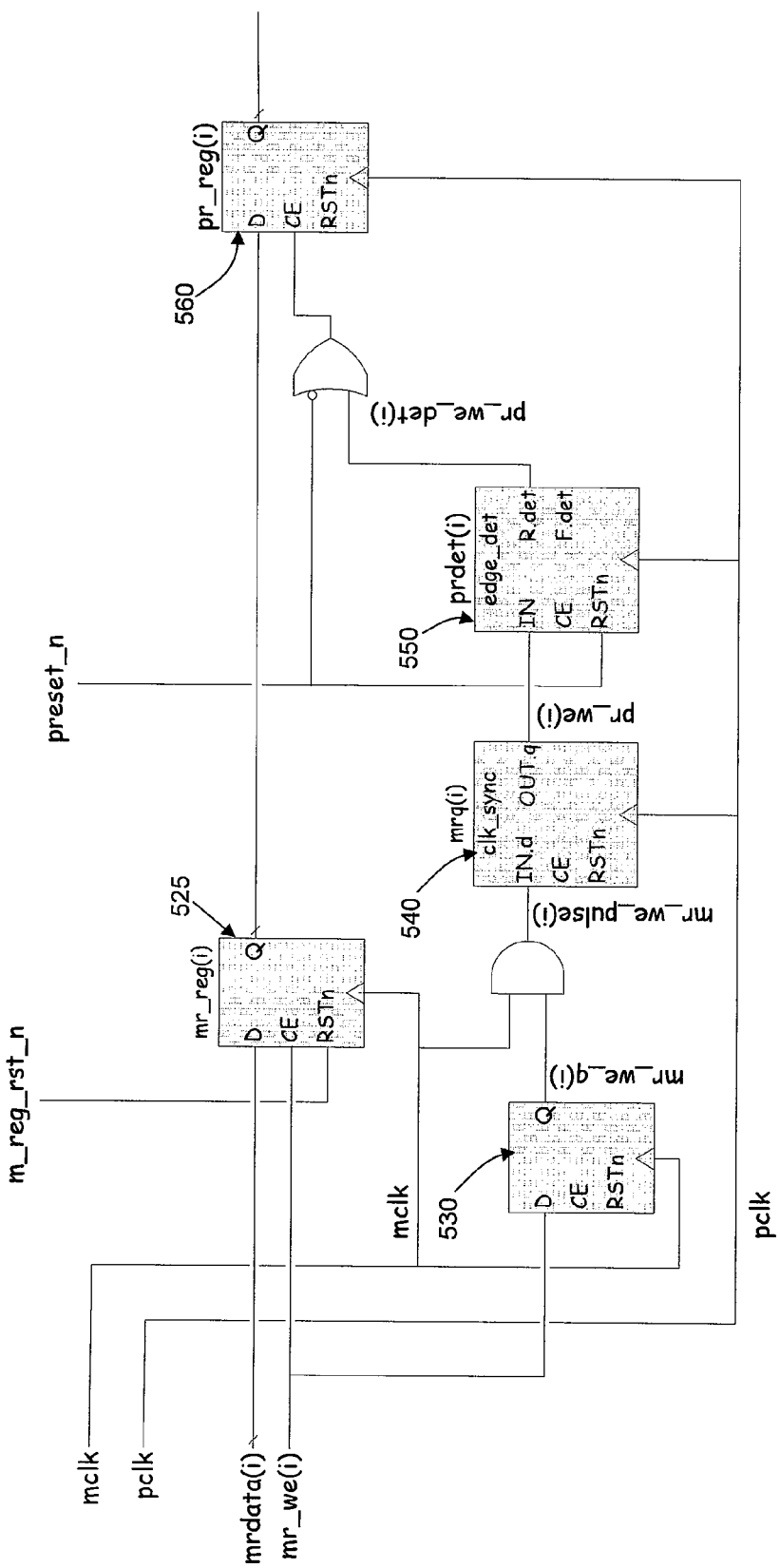
FIG. 5B is a block diagram of a portion of the CDC interface for the transfer of read data from the peripheral to the APB of FIG. 1, according to the preferred embodiment.

FIG. 5A is a block diagram showing circuitry for writing data from the pclk domain of the APB in FIG. 1 to the mclk domain of peripheral RTC 150, according to the preferred embodiment. Similarly, FIG. 5B is a block diagram showing the transfer of read data from RTC 150 to the APB. In FIGS. 5A and 5B, the subscript 'i' represents the bit/register number; paddr(i) is an address on the APB; pwdata(i) is a write data bus that is driven by the AHB-APB bridge 140 during write cycles (when pwrite is '1'); prdata(i) is a read data bus that is driven by the peripheral RTC 150 during read cycles (when pwrite is '0'; mwdata(i) is the APB write data array transferred from the pclk domain to the mclk domain; mrdata(i) is the peripheral RTC 150 output data to be read by the APB from prdata(i); mr_we(i) is a peripheral output data register write enable signal.

In FIG. 5A, logic 500 is provided for generating various control signals from the paddr(i), pwrite, psel penable and preset_n signals on the APB. The design and operational details of logic 500 for generating control signals will be known to a person of skill in the art and are not further described. Pulse sync interface 210 functions as described above in association with in FIGS. 2-4 for controlling the writing of data from the APB to RTC 150 via registers 510 and 520. More particularly, pwdata(i) is captured by pw_reg(i) register 510 in compliance with the AMBA specification. A register write enable signal pw_we(i) is generated by logic 500, which is logically ANDed with a busy indicator signal pw_we_busy (i) output from pulse sync circuit 210 (i.e. the signal pulse_a_busy in FIGS. 3 and 4). In an exemplary embodiment, the pw_reg(i) data is transferred to the mw_reg (i) register 520 in the mclk domain on the fourth rising edge of the mclk clock following completion of the APB write access. When the busy indicator signal pw_we_busy (i) is '1' new data is prevented from being written to register 510 during any subsequent write operation so as not to corrupt the previously written data.

As discussed in greater detail below with reference to FIG. 7, the individual pw_we_busy(i) bits are collected into an APB write busy flag (pw_we_busy) register 700 whose addressable register locations are configured using a pw_busy_loc generic.

Following the transfer of data from the pw_reg(i) register 510 to the mw_reg(i) register 520, two events occur: the busy signal pw_we_busy(i) is de-asserted on the second rising edge of pclk, and the mw_we_q(i) signal is asserted on the next rising edge of mclk, enabling the write data to be applied to the peripheral RTC 150.

According to the preferred embodiment, the clock_sync module 320 of pulse sync interface 210 requires a maximum of 32 microseconds×2=64 microseconds to move the control signals across domains, based on a 32 kHz mclk and a 500 nanosecond period (0.5 microseconds) to complete pwdata(i) access (17 clock cycles). Consequently, 128 data accesses can take place before the control signals across domains. If the data is not protected then the metastabililty problems discussed above may occur, Therefore, the output of pulse sync interface 210 is used to write protect data if the control signals have not yet transitioned across the domains.

The transfer of read data from the peripheral RTC 150 to the APB follows a similar process. As shown in FIG. 5B, read data mrdata(i) from peripheral RTC 150 is captured on the write enable signal mr_we(i) in mr_reg(i) register 525. The write enable signal is passed to the pclk domain via register 530, clock sync 540 and edge detector 550, for enabling the transfer of read data mrdata(i) to the APB clock domain pclk.

Read data is passed to the pclk domain on the second rising edge of the pclk signal following registration of write enable signal mr_we_q(i). Provided that pclk>=2×mclk, no write protection is required in the direction from mclk to pclk. However, if pclk=2×mclk, a single cycle-to-cycle wait state is implemented between writes to the same register.

The mclk clock signal and the write enable signal mr_we_q (i) output from register 530 are logically ANDed resulting in the generation of the signal mr_we_pulse(i), which ensures that the contents of mr_reg(i) register 525 are updated once for every mclk cycle that mr_we(i) is high. In the event that the output of mr_reg(i) register 525 is tied high at the module level, this mechanism updates the contents of the pr_reg(i) register 560 only once per mclk rising edge.

As discussed in greater detail below, a number of 'generic' parameters are provided for configuring the architecture of the CDC interface 160. A pr_mux_p_n_m generic defines the APB read input to be one of either P (i.e. data register pw_reg 510) or M (i.e. data register mr_reg 525) for each of the (up to) 32 addressable register locations. The range of the pr_mux_p_n_m generic extends from one to thirty-two registers in the preferred embodiment, thereby establishing the size of APB register table. The pr_mux_p_n_m generic also statically defines the pw_reg(i)/mr_reg_q(i) bus switch independently for each register location.

The interface is 'hard configurable' in this fashion for a number of reasons. First, unused portions of the data path are optimized and trimmed at synthesis. Second, the APB control register contents can be read back by the APB master without a dual clock domain crossing (CDC). Third, the module data read back [mwdata(i)] can be facilitated with individual top level connection (i.e. mrdata(i)<==mwdata(i)). Fourth, hard configuration via the pr_mux_p_n_m generic allows a simpler separation of reset behaviour, as discussed below in connection with FIG. 6. Finally, hard configuration simplifies simultaneous read/write access.

Additional generic parameters include a reg_rst_msk generic that defines the reset behaviour of the input data registers at each addressable register location, as discussed below in connection with FIG. 6; a pw_busy_loc generic that defines the addressable register location of the pw_busy register 700 shown in FIG. 7, and a rst_preload_val generic (not shown, but described in greater detail below) that defines the values loaded into the data registers on reset when the corresponding reg_rst_msk bit is set to zero (unmasked).

Figure 6:
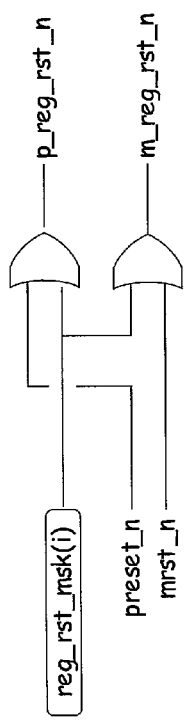
FIG. 6 is a block diagram showing reset logic for the registers in FIGS. 5A and 5B according to the preferred embodiment.

FIG. 6 shows reset logic for the input data registers 510 and 525 at the input stage of the pwdata-to-mwdata and the mrdata-to-prdata flow in FIGS. 5A and 5B, respectively. The reset behaviour is definable to allow register-by-register reset configuration, as specified by the reg_rst_msk generic. According to the default configuration all data registers are reset when the respective clock domain sync reset signal (p_reg_rst_n or m_reg_rst_n) goes active. The reg_rst_msk generic mask s or disables the preset_n and mrst_n signals from being used to reset/preload the contents of the registers, wherein the default is 0 (unmasked). Logic '1' in any bit position of the reg_rst_msk generic masks the reset behaviour such that the addressed input data register retains its values across the reset condition. During reset, the downstream data registers (i.e. mw_reg(i) 520 and mr_reg(i) 525) are reloaded with the upstream contents in order to ensure data synchronization.

When a register is cleared to zero, it is referred to as a 'reset' operation. The default reset value for all registers is 0x0000_0000. However, the default reset (or pre-load) value may be specified as non-zero using a rst_preload_val generic, which defines the reset behaviour of the input data registers at each addressable register location. Thus, the default value of rst_preload_val is 0x0000 0000, which results in a reset operation. However, in the event of a non-zero value of rst_preload_val, rather than being reset to zero the register can be loaded with the value of rst_preload_val.

The number of registers is defined by the pr_mux_p_n_m generic. As discussed in greater detail below with reference to FIG. 7, the pr_mux_p_n_m generic defines the APB read multiplexed input as one of either P (i.e. data register pw_reg 510) or M (i.e. data register mr_reg 525) for each of the (up to) 32 addressable register locations. If reg_rst_msk has fewer bits than the number of registers defined by the pr_mux_p_n_m generic, the value of reg_rst_msk is right justified and any undefined bit positions will default to '0'. If reg_rst_msk has a greater number of bits, the upper bits are trimmed.

Figure 7:
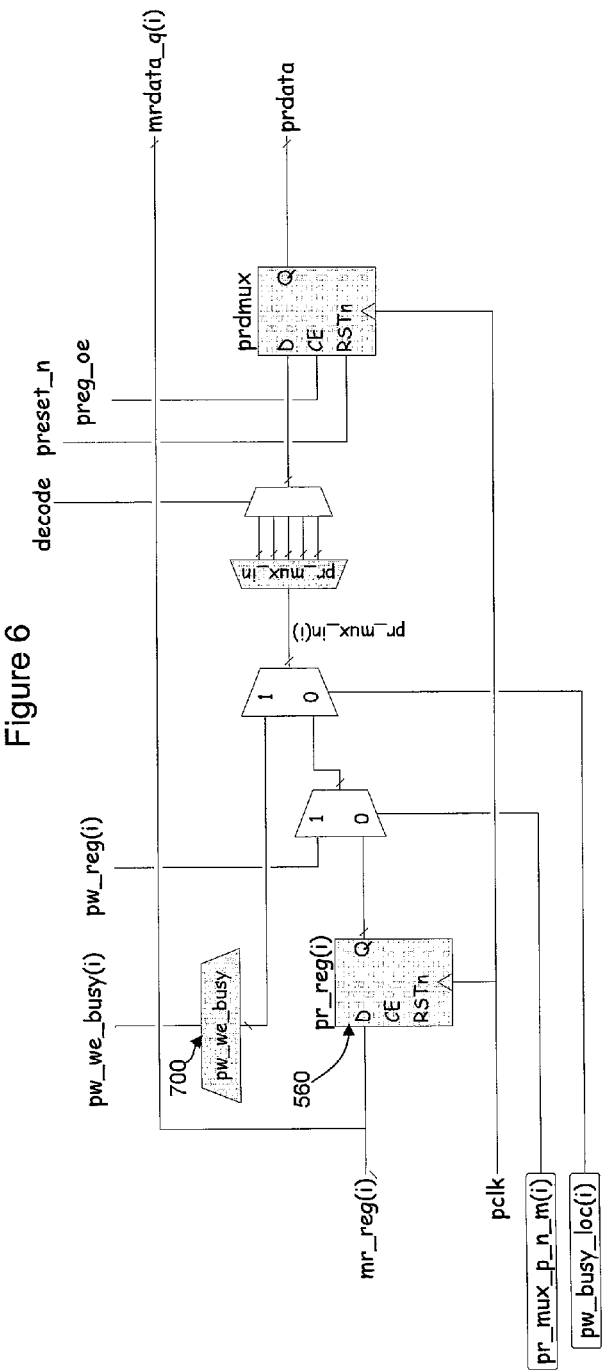
FIG. 7 is a block diagram of a portion of the CDC interface for read back data source selection, according to a preferred embodiment.

In FIG. 7, the read back data source selection is statically set by the pr_mux_p_n_m and pw_busy_loc generics. As stated above, pw_busy_loc defines the addressable register location of the pw_busy register 700 and pr_mux_p_n_m defines the number of addressable register locations, and therefore also the range of the pw_busy_loc generic. If pw_busy_loc has fewer bits, the value of pw_busy_loc is right justified and any undefined bit positions will default to '0'. If pw_busy_loc has a greater number of bits, the upper bits are trimmed.

A '1' in any bit position in the pw_busy_loc generic overrides the pr_mux_p_n_m selection and causes the write busy flag register data to appear at that register location. If multiple '1s' are specified in the pw_busy_loc generic, the write busy flag register data will appear at more than one register location.

The CDC 160 of the present invention takes advantage of APB variable latency extensions to guarantee a lossless interface. As set forth above, full handshaking is used to protect previously written data from being overwritten while new data written to the same address location by pausing data transfer until the write data path is clear. Back-to-back write access to different address locations are unhindered and allowed to process at full source clock (pclk) speeds according to the unique data array write buffer and multiplexed busy flag structure discussed above. Also as set forth above, APB control register contents in the pclk domain can be read back by the APB bus master without a dual channel clock crossing, and the dual reset channel of FIG. 6 allows individual reset control of the pclk and mclk domain logic.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A clock domain crossing interface for transferring data from a source clock domain to a destination clock domain, comprising:
   at least one pulse sync circuit for receiving a write control signal synchronized to said source clock domain and in response outputting a busy signal to said source clock domain and outputting said write control signal synchronized to said destination clock domain;
   at least one input register for latching write data from said source clock domain in response to a transition of said source clock in the event said busy signal is not active and preventing said write data from being latched in the event said busy signal is active so as not to corrupt previously written latched data; and
   at least one output register for receiving said write control signal from said pulse sync circuit and in response latching said write data from said at least one input register on a transition of said destination clock.

2. The clock domain crossing interface of claim 1, wherein said at least one pulse sync circuit comprises:
   a set/reset flip-flop for latching said write control signal in response to a transition of said source clock;
   a first clock sync module for transferring the latched write control signal from said set/reset flip-flop to said destination domain in response to a transition of said destination clock;
   an edge detect circuit for receiving the latched write control signal from said first clock sync module and outputting said write control signal synchronized to a single cycle of said destination clock;
   a further clock sync circuit for transferring the latched write control signal from said first clock sync module to said source domain in response to a transition of said source clock and applying said latched write control signal to said set/reset flip-flop for resetting said flip-flop; and
   a gate for receiving said latched write control signal from said set/reset flip-flop and the latched write control signal from said further clock sync circuit and in response generating said busy signal.

3. The clock domain crossing interface of claim 1, further comprising:
   a first gate for receiving said write control signal received by said at least one pulse sync circuit and said busy signal from said source clock domain, and in response generating a signal for clearing said at least one input register; and
   a second gate for receiving said write control signal from said at least one pulse sync circuit and a reset signal from said destination domain, and in response generating a signal for clearing said at least one output register.

4. The clock domain crossing interface of claim 1, further comprising:
   a further pulse sync circuit for receiving a read control signal synchronized to said destination clock domain and in response outputting said read control signal synchronized to said source clock domain;
   a further input register for latching read data from said destination clock domain in response to a transition of said destination clock; and
   a further output register for receiving said read control signal from said further pulse sync circuit and in response latching said read data from said further input register on a transition of said source clock.

5. The clock domain crossing interface of claim 4, wherein the further pulse sync circuit comprises:
- a further flip-flop for latching said read control signal in response to a transition of said destination clock;
- a gate for receiving said destination clock and said read control signal latched by said further flip-flop, and in response generating a write enable signal for ensuring that said read data is updated in said further input register once for each cycle of the destination clock that said read control signal is active;
- a further clock sync module for transferring the write enable signal to said source domain in response to a transition of said source clock; and
- an edge detect circuit for receiving the write enable signal from said further clock sync module and outputting said write enable signal synchronized to a single cycle of said source clock.

6. The clock domain crossing interface of claim 4, further comprising:
- a first gate for receiving a preset signal and a register reset mask signal and in response generating a reset signal for resetting addressed register locations of said at least one input register that are not masked by the register reset mask signal, such that the at least one output register is reloaded with said write data from said at least one input register for ensuring data synchronization; and
- a second gate for receiving a reset signal and said register reset mask signal and in response generating a reset signal for resetting addressed register locations of said further input register that are not masked by the register reset mask signal, such that the further output register is reloaded with said read data from said further input register for ensuring data synchronization.

7. A pulse sync circuit for transferring a synchronous input pulse from a source clock domain to a destination clock domain, comprising:
- a flip-flop for latching said input pulse in response to a transition of the source clock;
- a first clock sync module for transferring the latched input pulse from said flip-flop to said destination domain in response to a transition of the destination clock;
- a further clock sync circuit for transferring the latched pulse from said first clock sync module to said source domain in response to a transition of the source clock and applying said latched pulse to said flip-flop for resetting said flip-flop; and
- a gate for receiving said latched pulse from said flip-flop and the latched pulse from said further clock sync circuit and in response generating a busy signal.

8. A method of transferring data from a source clock domain to a destination clock domain, comprising:
- receiving a write control signal synchronized to said source clock domain and in response outputting a busy signal to said source clock domain and outputting said write control signal synchronized to said destination clock domain;
- latching write data from said source clock domain in response to a transition of said source clock in the event said busy signal is not active and preventing said write data from being latched in the event said busy signal is active so as not to corrupt previously write latched data; and
- receiving said write control signal from said pulse sync circuit and in response latching said write data on a transition of said destination clock.

9. The method of claim 8, further comprising:
- latching said write control signal in a flip-flop responsive to a transition of said source clock;
- transferring the latched write control signal from said flip-flop to said destination domain in response to a transition of said destination clock;
- receiving the latched write control signal and outputting said write control signal synchronized to a single cycle of said destination clock;
- transferring the latched write control signal to said source domain in response to a transition of said source clock and applying said latched write control signal to said flip-flop for resetting said flip-flop; and
- receiving said latched write control signal from said flip-flop and the latched write control signal transferred to said source domain and in response generating said busy signal.

10. The method of claim 8, further comprising:
- receiving a read control signal synchronized to said destination clock domain and in response outputting said read control signal synchronized to said source clock domain;
- latching read data from said destination clock domain in response to a transition of said destination clock; and
- receiving said read control signal from said further pulse sync circuit and in response latching said read data on a transition of said source clock.

11. A method of transferring a synchronous input pulse from a source clock domain to a destination clock domain, comprising:
- latching said input pulse in a flip-flop responsive to a transition of the source clock;
- transferring the latched input pulse from said flip-flop to said destination domain in response to a transition of the destination clock;
- receiving the latched pulse and outputting said pulse synchronized to a single cycle of the destination clock;
- transferring the latched pulse to said source domain in response to a transition of the source clock and applying said latched pulse to said flip-flop for resetting said flip-flop; and
- receiving said latched pulse from said flip-flop and the latched pulse transferred to said source domain and in response generating a busy signal.

12. The domain crossing interface of claim 1, wherein said at least one pulse sync circuit, input register and output register are scalable from one to thirty-two.

13. The pulse sync circuit of claim 7, further comprising an edge detect circuit for receiving the latched pulse from said first clock sync module and outputting said pulse synchronized to a single cycle of the destination clock.

* * * * *